UNITED STATES PATENT OFFICE.

ADRIAN MACHADO, OF MONTEVIDEO, URUGUAY.

ALIMENTARY MEAT COMPOUND PRESERVED BY MEANS OF SUGAR.

1,245,751. Specification of Letters Patent. Patented Nov. 6, 1917.

No Drawing. Application filed May 9, 1916. Serial No. 96,445.

*To all whom it may concern:*

Be it known that I, ADRIAN MACHADO, a citizen of Chile, residing at Montevideo, in the county of Montevideo and State of Uruguay, have invented certain new and useful Improvements in a new Alimentary Meat Compound Preserved by Means of Sugar, of which the following is a specification.

The present invention relates to a new alimentary compound, composed of meat, and is characterized principally by its preservation by means of sugar, by its sponginess and by its properties of keeping throughout long periods without the necessity of hermetically sealed containers.

The alimentary meat compounds known up to the present time are generally semi-liquid and are not susceptible to preservation or shipment unless hermetically inclosed. The chemical analysis of these proves that they contain great quantities of water, generally in proportions varying from 60 to 75%.

With the present compound, it is all the contrary, for although for reasons of hygiene and convenience, it will be generally put up in earthenware bowls, tins or any other appropriate containers, it can also be made in the form of cheeses. When made in this manner, a hard crust will in time form on the exterior, which will not affect any of its alimentary properties but will, on the contrary, serve to protect its keeping for lengthy periods.

Its highly nutritive and strengthening properties make this compound ideal for use in hospitals, sanatoriums, etc. As it is thoroughly digestible and possesses an agreeable flavor, it is very appropriate for children and persons of delicate health.

In its composition enter, in certain and fixed proportions, beef, chicken, tongues, fine sugar, gelatin and any appropriate essence (such as lemon, vanilla, etc.) to flavor same according to taste.

The chemical analysis effected by the "Instituto de Química Industrial" a Government institution of Montevideo, Uruguay, and duly signed by Dr. Latham Clark, director of same, gave the following result for a certain quantity of this new meat compound:

| | | |
|---|---|---|
| Moisture | 15.11% | |
| Ash | 0.38 | |
| Fatty material | 1.70 | |
| Total protein | 8.21 | |
| Pure protein | | 7.71% |
| Digestible protein | | 7.71 |
| Amids | 0.50 | |
| Phosphoric acid ($P_2O_5$) | 0.71 | |
| Sugar (calculated as $C_6H_{12}O_6$) | 69.09 | |
| Gelatin | 4.33 | |

The analytical method employed for the estimation of gelatin was devised by that institute, as in the chemical literature at their disposal they could find no acceptable method. It is therefore possible that there is a slight error in this determination, although they have reason to believe from a carefully conducted series of experiments that their method was sufficiently accurate.

For comparison with the above analysis, it is of interest to state, that ordinary beef contains from 60 to 75% of water, 15 to 25% of nitrogen containing substances, 2 to 8 per cent. of fat, and 0.5 to 2.0 per cent. of ash.

The preparation of this new meat compound is effected in the following manner: First the meat is carefully selected and boiled for several hours until all the substance has been extracted. Once this has been done, it is allowed to cool and the gelatin is boiled with the sugar in a separate receptacle until it forms a syrup. This having been done, it is mixed with the meat extract and is boiled anew until the necessary consistency has been obtained. During ebullition any appropriate essence is added to impart the desired flavor to the compound. On cooling the sugar forms a crust which serves to protect the compound from the action of the air and keeps it soft and fresh for many months.

Having now described the nature of my invention and the manner in which it is to be performed, I declare that what I claim is:

1. The herein-described alimentary compound which is composed of meat extract, together with gelatin and sugar.

2. The herein-described alimentary compound which is composed of meat extract produced by boiling, gelatin, and sugar, combined in substantially the proportions of 27% meat, 69% sugar, and 4% gelatin.

3. The herein-described alimentary compound which is composed of meat extract produced by boiling, which contains substantially 15% moisture, 2% fatty material, 8% protein, and small percentages of phosphoric acid, amids and ash, mixed with 69% sugar and 4% gelatin.

4. The herein-described process of producing an alimentary compound which consists in boiling meat to obtain an extract, cooling the extract, mixing sugar with the cooled extract, and boiling this mixture.

5. The herein-described process of producing an alimentary compound which consists in boiling meat to obtain an extract, cooling the extract, boiling gelatin with sugar until a syrup is produced, mixing this syrup with the meat extract, and boiling this mixture.

In testimony whereof I affix my signature in the presence of two witnesses.

ADRIAN MACHADO.

Witnesses:
JOHN C. TERRY,
REGINALD A. BRARE.